(12) United States Patent
Carbon et al.

(10) Patent No.: US 8,228,599 B1
(45) Date of Patent: Jul. 24, 2012

(54) COHERENT BEAM COMBINING USING REAL TIME HOLOGRAPHY

(75) Inventors: Magarita A. Carbon, Calabasas, CA (US); Dennis M. Guthals, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 12/635,689

(22) Filed: Dec. 10, 2009

(51) Int. Cl.
*H01S 3/00* (2006.01)
(52) U.S. Cl. ............................ 359/349; 359/16; 250/550
(58) Field of Classification Search .................... 359/349
See application file for complete search history.

(56) References Cited

U.S. PATENT DOCUMENTS

| | | | | |
|---|---|---|---|---|
| 4,847,477 A * | 7/1989 | Smith | .......................... | 250/201.9 |
| 5,148,323 A | 9/1992 | Campbell et al. | | |
| 5,258,860 A | 11/1993 | Schehrer et al. | | |
| 6,219,360 B1 * | 4/2001 | Komine | ............................ | 372/9 |
| 6,366,356 B1 * | 4/2002 | Brosnan et al. | ................ | 356/477 |
| 6,708,003 B1 * | 3/2004 | Wickham et al. | ............. | 398/102 |
| 7,468,832 B2 * | 12/2008 | Rothenberg et al. | ...... | 359/341.41 |
| 7,505,138 B2 | 3/2009 | Guthals et al. | | |
| 2009/0201575 A1 * | 8/2009 | Fermann et al. | ......... | 359/341.32 |

OTHER PUBLICATIONS

C. Bellanger, A. Brignon, J. Colineau, J. P. Huignard, 'Coherent fiber combining by digital holography', Opt. Lett., vol. 33, No. 24, Dec. 15, 2008, pp. 2937-2939.*
M.A.Carbon, D.M.Guthals, J.D.Logan, Wave-Optics Modeling of Real-Time Holographic Wavefront Compensation Systems Using OSSim, in: Advanced Wavefront Control Methods, Devices, and Applications III, edited by M.T.Gruneisen, J.D. Gonglewski, M.K. Giles, Proc. SPIE vol. 5894, 5894131-7 (2005).

* cited by examiner

*Primary Examiner* — Arnel C Lavarias
(74) *Attorney, Agent, or Firm* — Felix L. Fischer

(57) ABSTRACT

A system for combining multiple coherent optical beams incorporates a plurality of coherent beamlets expanded to an aperture. An interferometer receives a sample of a full aperture unphased combination of the plurality of beamlets and provides interference fringes. A spatial light modulator (SLM) receives the fringes from the interferometer and generates a hologram as a diffraction grating. Relay optics transmit the full aperture unphased combined beamlets to the SLM and receive a diffraction corrected full aperture phased beam from the diffraction grating hologram for emission to the far field.

16 Claims, 6 Drawing Sheets

COHERENT BEAM COMBINING USING REAL TIME HOLOGRAPHY

REFERENCE TO RELATED APPLICATIONS

This application is copending with application Ser. No. 12/635,691 filed on Dec. 10, 2009 by inventors Dennis M. Guthals, Daniel J. Sox, Margarita A. Carbon and Blair F. Campbell entitled Incoherent Beam Combining of Parallel Beams with Optical Path Compensation using Real Time Holography and application Ser. No. 12/635,696 filed on Dec. 10, 2009 by inventors Daniel J. Sox, Dennis M. Guthals, Margarita A, Carbon and Blair F. Campbell entitled Incoherent Spectral Beam Combining with Optical Path Compensation Using Real Time Holography and having application Ser. No. 12/635,698 filed on Dec. 10, 2009 by inventors Daniel J. Sox, Dennis M. Guthals, Blair F. Campbell and Margarita A, Carbon entitled Real Time Holographic Fringe Blazing Using Fringe Minima Detection and each of which is incorporated herein by reference as though fully set forth.

BACKGROUND INFORMATION

Field

Embodiments of the disclosure relate generally to the field of optical systems for laser transmission and more particularly to embodiments to combine multiple sub-aperture coherent laser sources using a local-referenced interferometer generated hologram on a Spatial Light Modulator to remove optical train and phase errors to provide diffraction-limited full aperture far field intensity.

BACKGROUND

Combining of coherent laser beams for delivery through a common aperture provides for increased power and other desired characteristics. Current approaches for combination of coherent beams require separate beam control or adaptive optics for each laser beam. Additionally very precise piston, tip and tilt tolerances are required in the beam control system and optical trains to maintain the beams within the alignment ranges of the control loops. Existing solutions require separate piston, tip, and tilt control on each sub-aperture. Optical systems which maintain the required high tolerances are complex and expensive. Additionally, conventional adaptive optical devices and controls are fragile and require constant tuning therefore becoming impractical for fieldable systems.

It is therefore desirable to provide a laser beam control system which reduces complexity, size, weight, and power, reduces the adaptive optics requirements and reduces cost while improving far field beam quality.

SUMMARY

Exemplary embodiments provide a system for combining multiple coherent optical beams which incorporates a collimating lens expanding a plurality of coherent beamlets to an aperture. An interferometer receives a sample of a full aperture unphased combination of the plurality of beamlets and provides interference fringes. A spatial light modulator (SLM) receives the fringes from the interferometer and generates a hologram as a diffraction grating. Relay optics transmit the full aperture unphased combined beamlets to the SLM and receive a diffraction corrected full aperture phased beam from the diffraction grating for emission to the far field.

In one configuration, a seed laser provides a coherent beam to a beam splitter which creates a plurality of coherent beamlets. An array of amplifiers then processes the plurality of beamlets received by the collimating lens.

In the exemplary configuration a local interferometer is employed with a local reference beam segregated from the plurality of beamlets processed by the amplifier array. The local reference interferometer includes a focal plane array receiving the sample of the full aperture unphased combination of the plurality of beamlets interfered with the local reference beam to provide the interference fringes. A fringe processor receives the interference fringes from the focal plane array and transmitting the interference fringes to the spatial light modulator. For improved performance, the fringe processor blazes the fringes for transmission to the SLM The exemplary embodiments may be used in a method for combining multiple coherent optical beams by propagating a plurality of coherent beamlets through a collimating lens to fill an aperture and separating a sample of the output of the combined beamlets to an interferometer. The combined beamlet and sample are interferred to form interference fringes. The fringes are then transferred to a spatial light modulator (SLM) to generate a real time hologram. The combined beamlets from the relay optics are then diffracted from the SLM hologram fringes and emitted to the far field with diffractive compensation for the tip, tilt, piston differences and wave propagation front curvatures of each sub-aperture.

In exemplary embodiments using a local reference interferometer, one beamlet is segregated as a local reference which is then provided as the local reference to the interferometer. Interfering the combined beamlet sample then includes combining the local reference with the combined beamlets on a focal plane array.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
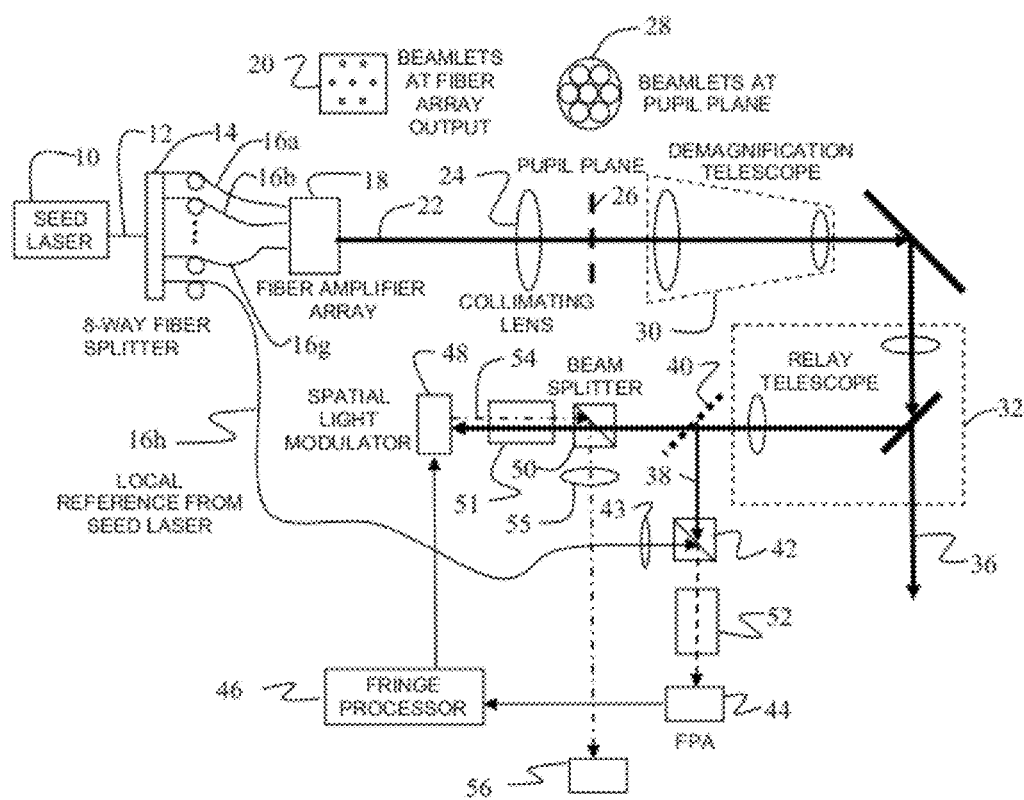
FIG. 1 is a block diagram of the elements of an embodiment.
Figure 2:
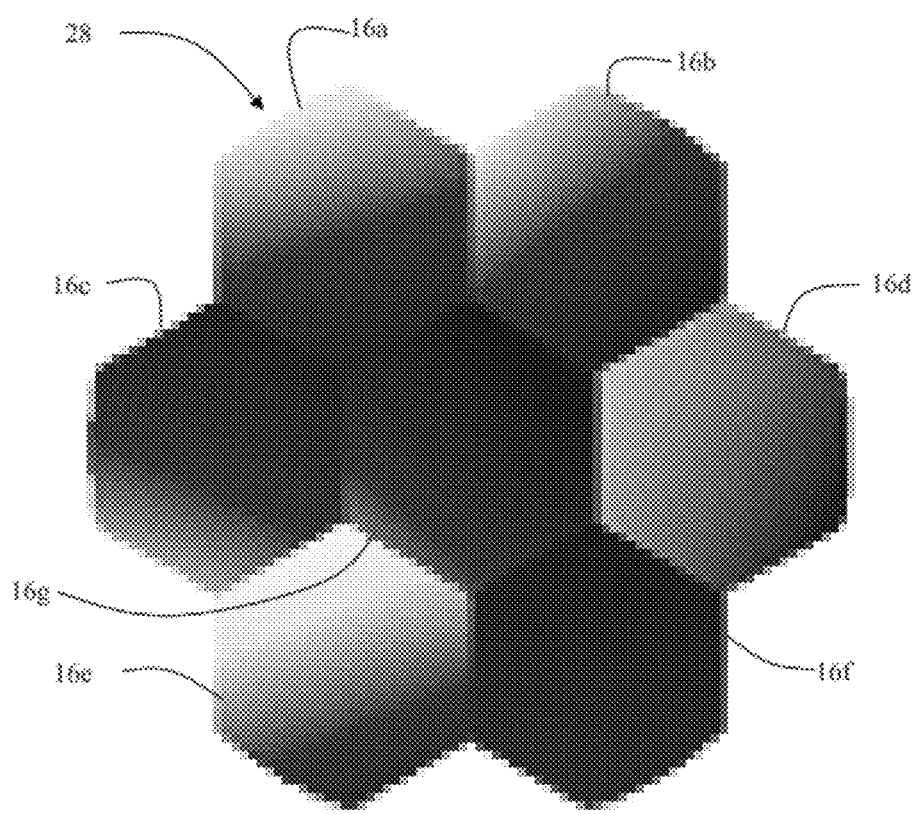
FIG. 2 is a depiction of the expanded coherent beamlets showing phase differences at the pupil plane.

The embodiments described herein demonstrate a system for efficient and simple beam combination of multiple coherent laser sources such as solid state, fiber, etc. for directed energy and Lasercom and other applications. Several sub-aperture coherent laser sources are combined using a local-referenced interferometer generated hologram on a Spatial Light Modulator (SLM) to remove piston, tip, and tilt errors and form a diffraction-limited full aperture far field intensity. Referring to FIG. 1 for an exemplary embodiment, a seed laser 10 provides a coherent beam 12 to a beam splitter 14. For various applications, the seed may be a laser source such as small laser diodes (single-frequency or gain-switched), short-cavity fiber lasers, and miniature solid-state lasers such as nonplanar ring oscillators (NPROs) or other laser. For the embodiment shown, the beam splitter 14 is a fiber optic beam splitter and provides a 8-way split with seven coherent beams 16a-16g provided to a fiber amplifier array 18 with an eighth beam 16h employed as a local reference to be described in greater detail subsequently. The characteristics of the seven coherent beams as they exit the fiber splitter 14 for input to the amplifier are represented as cross section element 20. The combined non-phased full aperture laser beamlets 22 are routed through a collimating lens 24 resulting in a pupil plane 26. The seven amplified coherent beams or beamlets are allowed to propagate and spatially fill the pupil plane 26. A representation of the combined non-phased full aperture laser beamlets 22 is shown as cross section element 28. FIG. 2 shows a representation of the beamlets in the aperture with piston, tilt, tip and other induced phase differences demonstrated by the grey scale pattern. Only gross and minimal alignment of piston, tip and tilt are required for the non-phased beamlets. Beamlet tip and tilt need only to be aligned to within ~5 waves or an amount to produce a few fringes for the hologram as discussed in detail below. For conventional techniques using optical path-length matching approximately 1/10 wave is required for adequate performance. The embodiment disclosed is very insensitive to piston phase mismatch and allows for correction of hundreds of waves of piston up to the limit of the laser coherence length within the temporal correction bandwidth.

Figure 3:
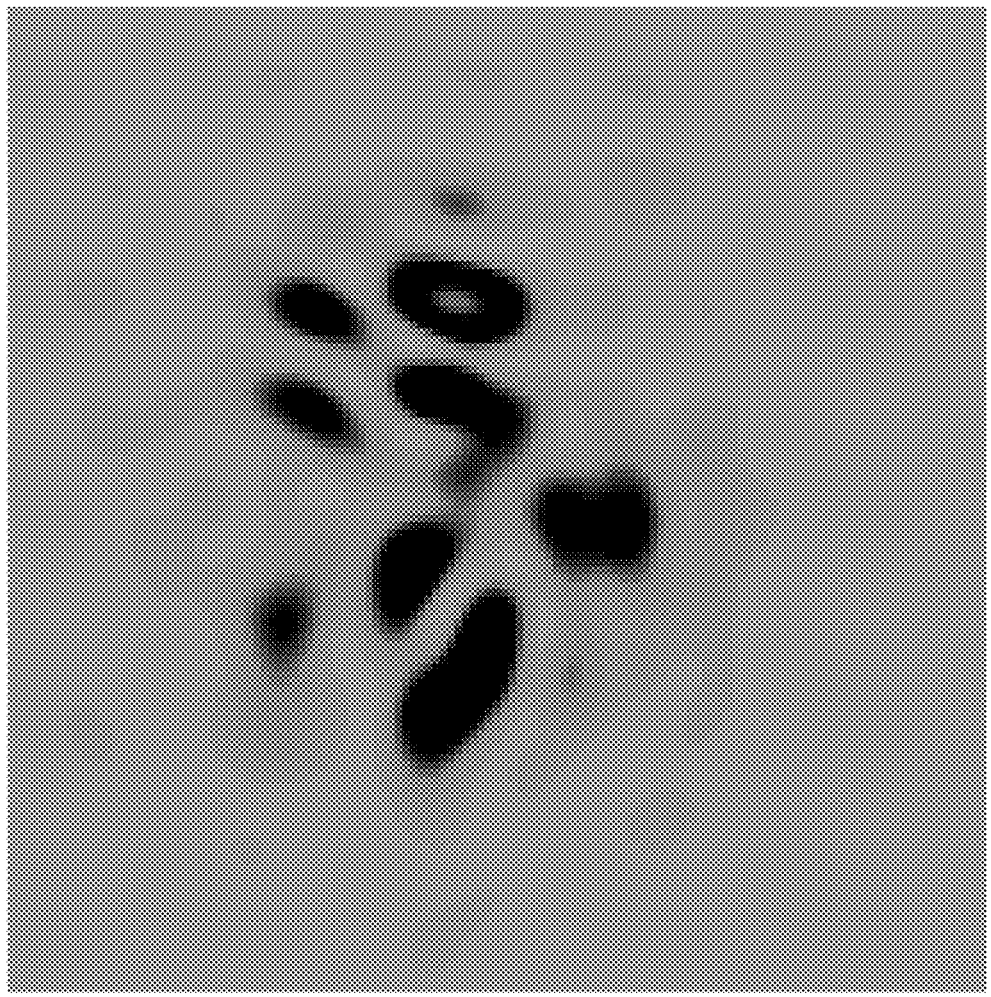
FIG. 3 is a depiction of the far field image for combined non-phased full aperture laser beamlets.

Returning to FIG. 1, the combined non-phased full aperture laser beamlets are reimaged through a demagnification telescope 30 and, in the relay optics for the embodiment shown, are internally passed by the beam control system through an optical train represented by relay telescope 32. If the combined non-phased full aperture laser beamlets were emitted to the far field without correction as notionally represented by beam ray 36, the resulting far field image is represented by FIG. 3 showing an uncompensated beam with large overlapped far field spots given by the sub-aperture diffraction limit.

Again returning to FIG. 1, a sample of the combined non-phased full aperture laser beamlets, represented by beam ray 38, constituting approximately 1% of the combined beam for the embodiment shown, is redirected as a sample leg by beam splitter 40 to combiner 42 where it is interfered with the reference eighth beam 16h, as originally split in the fiber splitter 14 and provided through relay lens 43, to form interference fringes. The interference pattern is received and the fringes and phase differences between the seed reference beam and the combined non-phased full aperture laser beamlets are recorded by an interferometer detector such as focal plane array (FPA) 44. For the embodiment shown a local referenced interferometer (LRI) is shown, however, a self referenced interferometer (SRI) may be employed in alternative embodiments. The interference pattern is processed by a fringe processor 46 which transfers the fringes updated at the FPA frame rate to a spatial light modulator (SLM) 48 as a blazed grating. High optical efficiency requires the blazed grating to have at least 7-8 pixels per fringe. The frame rate is sufficiently fast to sample the coherence of the lasers allowing correction to be made on a time scale where the phase differences are not changing. Processing for the embodiment shown in the drawing provides sampling and correction performed in the pupil plane.

The main portion of the combined non-phased full aperture laser beamlets passing through beam splitter 40 proceeds through beam splitter 50 to SLM 48. For the embodiment shown, beam splitter 50 is a polarizing beam splitter and the coherent beam source provides polarized lasers for this implementation. For the embodiment shown, the demagnification telescope 30 reimages the beamlet pupil plane for input into the interferometer and processing on the small area of the focal plane array. The relay telescope 32 relays the pupil plane through interferometer onto the FPA and the SLM. This pupil plane must also be relayed to the SLM and pixels in the various pupil planes need to be registered to each other. Pupil plane reimaging may also be required for packaging considerations. A reimaging registration telescope 51 for matching of m=1 to n pixels for registration between the FPA and SLM may be employed, if required. Additionally, a reimaging registration telescope 52 may be employed for direct correction of the image on the FPA. SLM 48 creates a real time hologram of the blazed grating provided by the fringe processor which diffracts the beamlets into the conjugate order. For the embodiment shown, the SLM employed is high power dual frequency Liquid Crystal Spatial Light Modulator (LCSLM) providing 100×100 pixel resolution at 100 kW allowing eight pixels per fringe for best performance.

Figure 4:
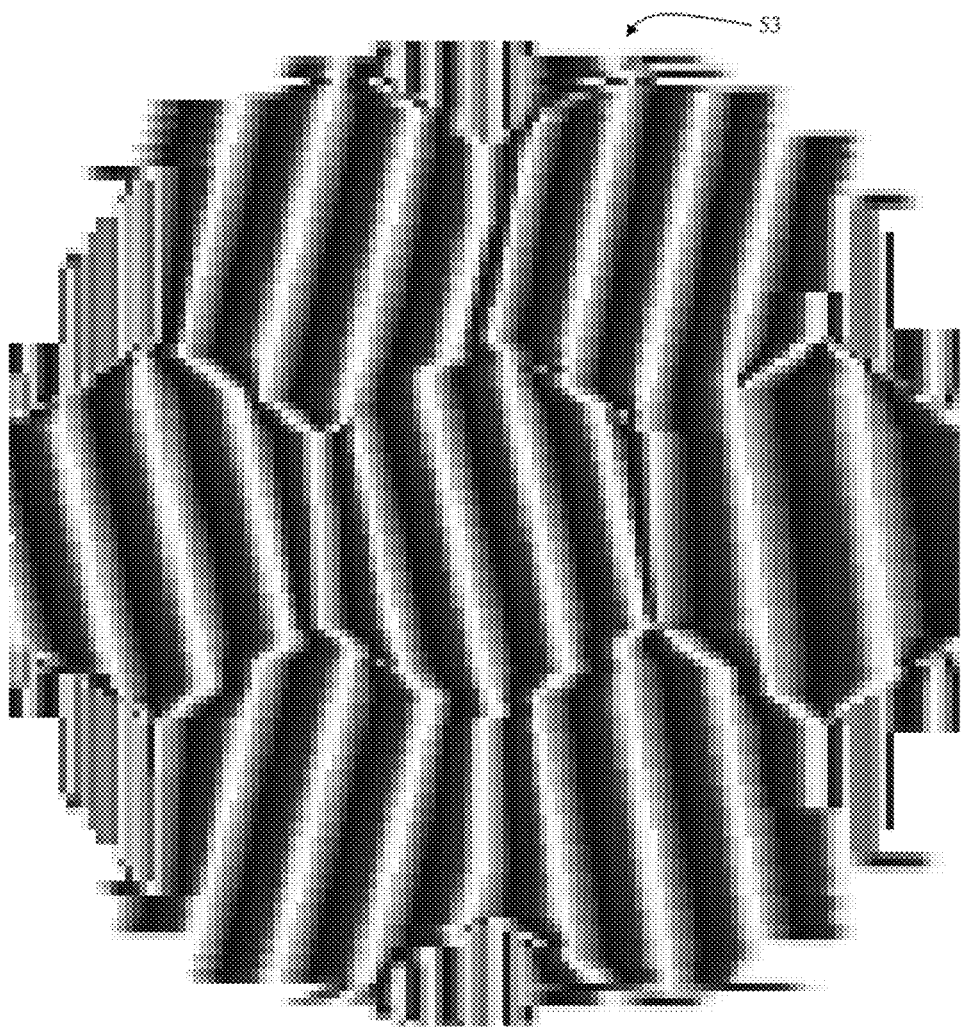
FIG. 4 is a depiction of the blazed holographic fringes provided by the Spatial Light Modulator.
Figure 5:
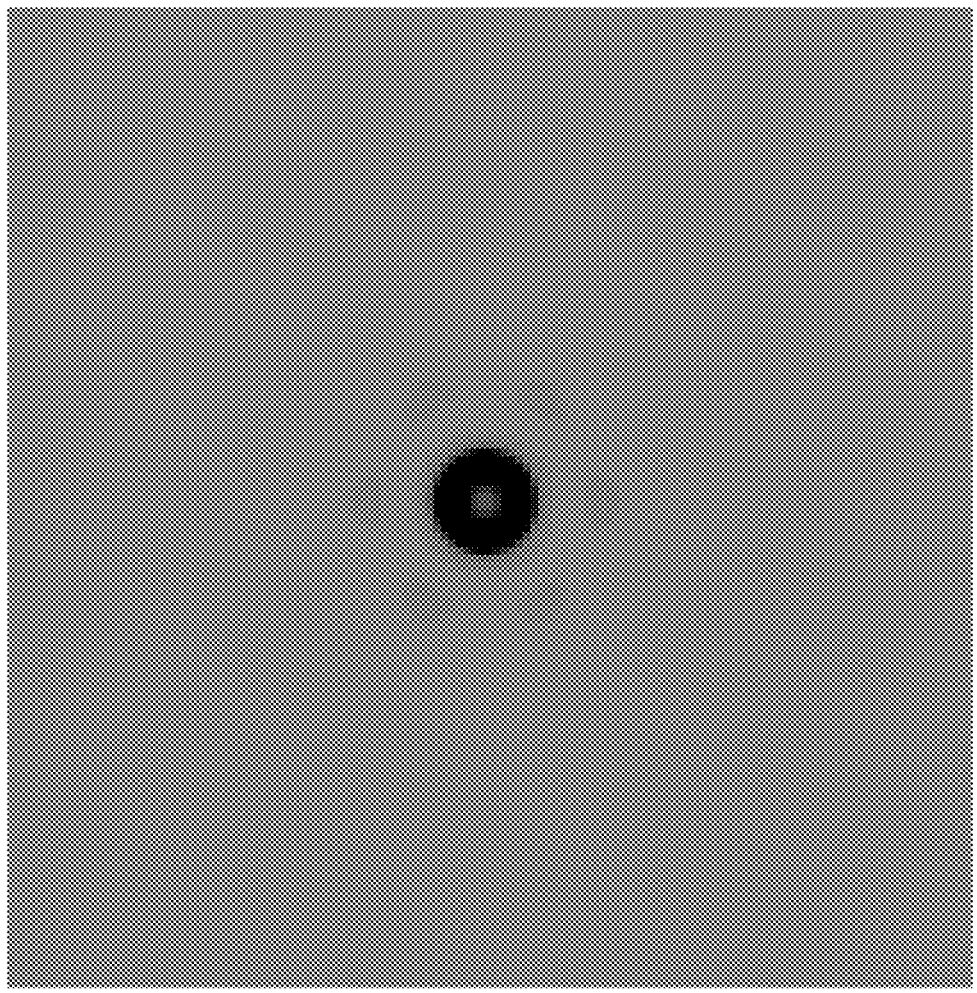
FIG. 5 is a depiction of the far field image for the phase corrected combined beamlets; and, FIG. 6 is a flow chart of the method employed by the embodiment to combine multiple subaperture coherent laser sources.

A representative image of the blazed hologram 53 is shown in FIG. 4. The real time blazed fringe hologram on the SLM provides a single adaptive optical element for complete correction of the entire aperture and the combined beamlets. Diffraction efficiency is greater than 90%. Returning to FIG. 1, the phase corrected combined beamlets 54 are diffracted back from hologram generated by the SLM to beam splitter 50 for emission through output lens 55 to the far field represented notionally by element 56. The phase corrected beamlets are combined coherently into one full aperture planewave beam with diffractive compensation by the hologram generated by the SLM for tip, tilt and piston differences in the six individual beamlets and wave front curvatures (acquired due to propagation through the entire amplification and optical relay train) of each sub-aperture and deliver the smallest possible far field spot size given by the full aperture diffraction limit. Far away from the aperture, the angle at which the first minimum of the Airy Disc occurs, measured from the direction of incoming light, is given by the approximate formula $\sin(\theta) = 1.22 \lambda/d$ where $\lambda$ is the wavelength of the light and d is the diameter of the aperture. Incoherent phasing gives overlapped larger spots determined by the subaperture beam diameters as shown in and previously described with respect to FIG. 3. Coherent phasing or combining gives the smallest possible far-field spot determined by the full aperture diameter A representative image of the corrected combined beamlets is shown in FIG. 5. A wave-optics simulation of coherent beam combining using the process disclosed herein with exemplary beam distortions of 1λ RMS tilt, 10λ tip, 100λ piston provides a Strehl increases from <0.1 to 0.7 for the corrected beam.

The embodiment disclosed provides for creating a high beam quality power-scalable laser source using the ability of the real time generated hologram in the SLM to compensate not only for several waves of tip/tilt and substantially unlimited piston differences (eliminating the precise matching of beam path lengths required by prior art adaptive optics systems), but also for wavefront distortions inside the combined wavefronts. Relative optical relay lengths in the system are also directly compensated by the created holographic diffraction grating and since this is a phase correction not an optical path length correction makes the relay optics independent of tight path length tolerances required of conventional systems. This greatly reduces the complexity, size, weight, and power over other approaches while using only one adaptive optical device, the SLM generated hologram.

Figure 6:
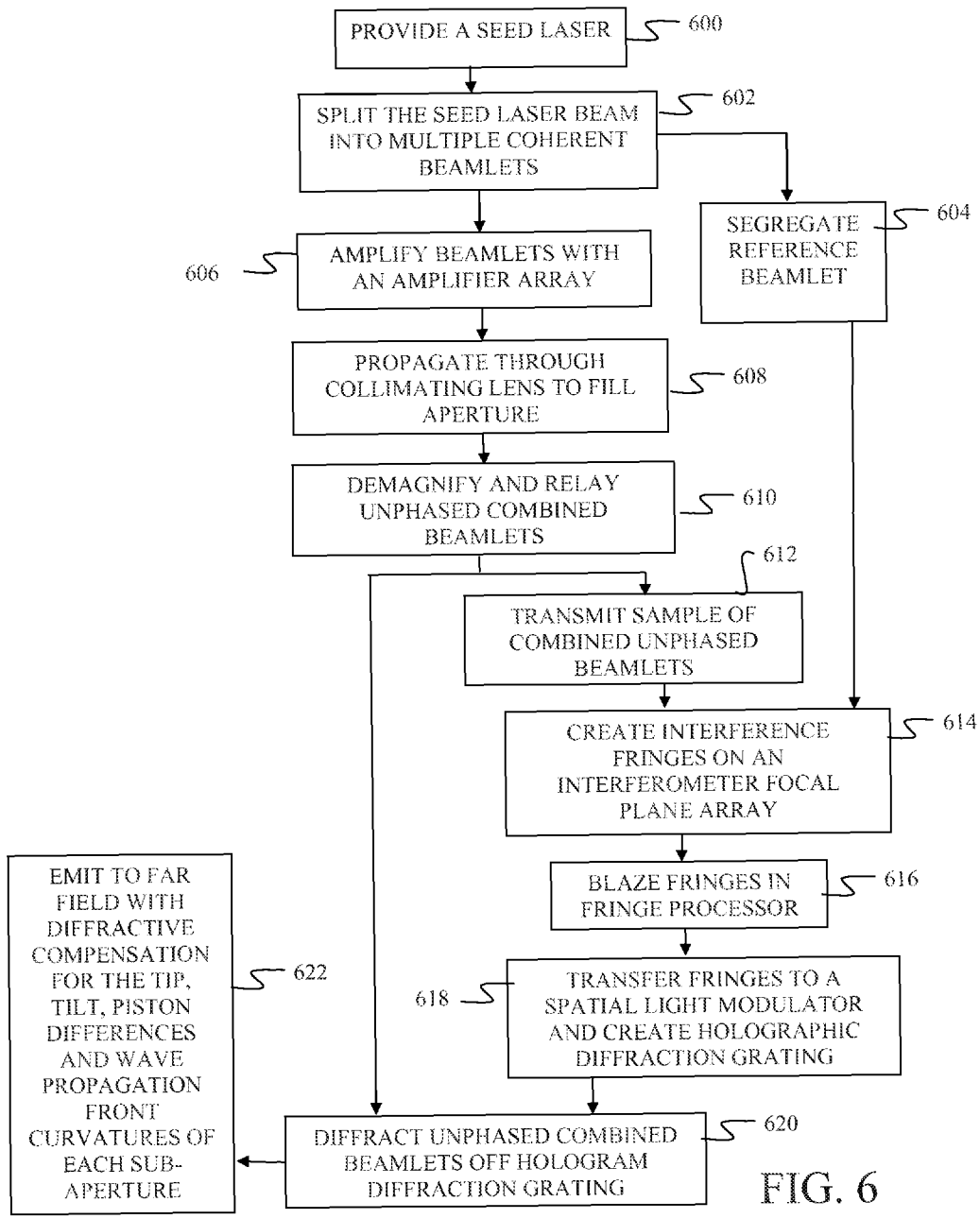

The exemplary embodiment is employed as shown in FIG. 6 to provide a seed laser, step 600, receive the seed laser input and split the seed beam into multiple beamlets, step 602. One beamlet is segregated as a local reference, step 604. A fiber amplifier array is employed to increase the power of the individual beamlets, step 606 and the amplified beamlets are propagated through a collimating lens to fill the aperture, step 608. Demagnification and relay telescopes provide relay optics to transmit the unphased combined beamlets, step 610 and a sample of the output of the combined beamlets to an interferometer detector such as a focal plane array, step 612, which is interfered with the local reference beamlet to form interference fringes, step 614. The interference fringes are then blazed in a fringe processor, step 616, and transferred to a spatial light modulator generating a real time hologram, step 618. The combined beamlets from the relay optics are then diffracted from the SLM hologram fringes, step 620, and emitted to the far field with diffractive compensation for the tip, tilt, piston differences and wave propagation front curvatures of each sub-aperture, step 622.

Exemplary applications of beam correction as enabled by the embodiments disclosed include beam combination for high power lasers, telecommunication systems (Lasercom) and imaging systems.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for combining multiple coherent optical beams comprising:
    a collimating lens expanding a plurality of coherent beamlets to an aperture;
    an interferometer receiving a sample of a full aperture unphased combination of the plurality of beamlets and providing interference fringes;
    a spatial light modulator (SLM) receiving the interference fringes and generating a hologram; and
    relay optics for transmitting the full aperture unphased combined beamlets to the SLM and receiving a diffraction corrected full aperture phased beam for far field emission.

2. The system for combining multiple coherent optical beams as defined in claim 1 further comprising:
    a beam source providing a coherent beam;
        a beam splitter receiving the coherent beam and providing the plurality of beamlets; and
    an array of amplifiers processing the plurality of beamlets.

3. The system for combining multiple coherent optical beams as defined in claim 2 wherein
    the plurality of beamlets provided by the beam splitter includes a local reference beam segregated from the plurality of beamlets processed by the amplifier array and
    the interferometer is a local reference interferometer including
    a focal plane array receiving the sample of the full aperture unphased combination of the plurality of beamlets interfered with the local reference beam to provide the interference fringes, and
    a fringe processor receiving the interference fringes from the focal plane array and transmitting the interference fringes to the spatial light modulator.

4. The system for combining multiple coherent optical beams as defined in claim 3 wherein the fringe processor blazes the interference fringes.

5. The system for combining multiple coherent optical beams as defined in claim 1 wherein the relay optics include a demagnification telescope for refocusing the full aperture unphased combination of the plurality of beamlets.

6. The system for combining multiple coherent optical beams as defined in claim 2 wherein the beam source is a seed laser selected from a set of small laser diodes, short-cavity fiber lasers, and miniature solid-state lasers.

7. A high beam quality power scalable laser source comprising:
    a seed laser providing a coherent beam;
        a beam splitter receiving the coherent beam and providing a plurality of beamlets;
        an array of amplifiers processing the plurality of beamlets;
    a collimating lens expanding the plurality of coherent beamlets to an aperture;
        an interferometer receiving a sample of a full aperture unphased combination of the plurality of beamlets and providing interference fringes;
        a spatial light modulator (SLM) receiving the interference fringes and generating a hologram; and
    relay optics for transmitting the full aperture unphased combined beamlets to the SLM for diffraction from the hologram and receiving a diffraction corrected full aperture phased beam for far field emission.

8. The high beam quality power scalable laser source as defined in claim 7 wherein the seed laser is selected from a set of small laser diodes, short-cavity fiber lasers, and miniature solid-state lasers.

9. The high beam quality power scalable laser source as defined in claim 7 wherein
    the plurality of beamlets provided by the beam splitter includes a local reference beam segregated from the plurality of beamlets processed by the amplifier array and
    the interferometer is a local reference interferometer comprising
    a focal plane array (FPA) receiving the sample of the full aperture unphased combination of the plurality of beamlets interfered with the local reference beam to provide the interference fringes, and
    a fringe processor receiving the interference fringes from the focal plane array and transmitting the interference fringes to the spatial light modulator as a blazed grating.

10. The high beam quality power scalable laser source as defined in claim 7 wherein the relay optics includes at least one reimaging registration telescope.

11. The high beam quality power scalable laser source as defined in claim 10, wherein the at least one reimaging registration telescope reimages the combined beam for matching of pixels for registration between the FPA and SLM.

12. A method for combining multiple coherent optical beams comprising:
    propagating a plurality of coherent beamlets through a collimating lens to fill an aperture with an output having combined beamlets;
    separating a sample of the output to an interferometer;
    interfering the sample to form interference fringes;
    transferring the fringes to a spatial light modulator (SLM) and generating a real time hologram;
    diffracting the combined beamlets from the SLM hologram fringes; and emitting the combined beamlets to a far field with diffractive compensation for tip, tilt, piston differences and wave propagation front curvatures of each sub-aperture.

13. The method of claim 12 further comprising:
providing a seed laser;
receiving an input beam from the seed laser and splitting the input beam into multiple beamlets;
increasing power of the individual beamlets using a fiber amplifier array.

14. The method of claim 13 further comprising:
segregating one of the multiple beamlet as a local reference;
providing the local reference to the interferometer;
and wherein the step of interfering the sample includes combining the local reference with the combined beamlets on a focal plane array (FPA).

15. The method of claim 12 further comprising:
demagnifying to refocus and directing the combined beamlets through relay optics.

16. The method of claim 15 further comprising reimaging the combined beamlets for matching pixels for registration between the FPA and SLM.

* * * * *